United States Patent [19]

Schoellkopf

[11] 4,161,957

[45] Jul. 24, 1979

[54] LEAKAGE PROTECTIVE APPARATUS FOR STORAGE CONTAINERS OR THE LIKE

[75] Inventor: Ernst H. Schoellkopf, Zumikon, Switzerland

[73] Assignee: Ironflex AG, Aurich, Switzerland

[21] Appl. No.: 727,614

[22] Filed: Sep. 28, 1976

[30] Foreign Application Priority Data

Oct. 6, 1975 [CH] Switzerland ............... 12946/75
Dec. 24, 1975 [CH] Switzerland ............... 16799/75
Mar. 15, 1976 [DE] Fed. Rep. of Germany ....... 2610769

[51] Int. Cl.² ........................................... G01M 3/28
[52] U.S. Cl. ..................... 137/205; 137/389; 137/558; 137/565; 417/9; 73/40.5 R
[58] Field of Search ............ 137/557, 558, 205, 389, 137/391, 392, 565; 417/9, 138, 200; 73/40.5 R; 340/242

[56] References Cited

U.S. PATENT DOCUMENTS

| | | | |
|---|---|---|---|
| 1,308,005 | 6/1919 | Fesler | 137/205 X |
| 2,071,703 | 2/1937 | Nelson et al. | 417/200 |
| 3,465,767 | 9/1969 | Peres | 137/205 X |

Primary Examiner—William R. Cline
Attorney, Agent, or Firm—Lane, Aitken & Ziems

[57] ABSTRACT

A leakage protective apparatus for the outlet line of a storage container for flowable material includes a conduit arrangement which connects a storage container and consumer and itself includes a pump for pumping the flowable material from the storage container to the consumer. The conduit arrangement also includes an intermediate container connected between the pump and storage container. A negative pressure source is connected to the intermediate container. The conduit also includes a shutoff valve. A detecting means is provided for detecting a predetermined minimum negative pressure in the conduit arrangement, a switching device being provided for closing the shutoff valve when the detecting means detects a pressure above the predetermined minimum negative pressure.

13 Claims, 4 Drawing Figures

LEAKAGE PROTECTIVE APPARATUS FOR STORAGE CONTAINERS OR THE LIKE

BACKGROUND OF THE INVENTION

The present invention relates to a new and improved construction of an outflow or leakage protective apparatus for a storage container or the like for the storage of fluent or flowable storable materials, especially heating oil, which is supplied to a consumer from the storage container by means of a pump through the agency of a conduit system or arrangement.

It is already known from Swiss Pat. No. 423,379 to monitor leaks in the walls of storage containers, by placing a reference chamber under vacuum, this reference chamber can be formed within the storage container itself above the level of a liquid to be stored, or further, it is known from Swiss Pat. No. 410,552 that the reference chamber can be the intermediate compartment located between both walls of a double-wall storage container.

In order, when necessary, to protect the conduit arrangement against any leakage or spill-out, its components, such as the outflow conduit and the return flow conduit, previously were mounted in a thick sleeve which returned any possible leakage back to the storage container. Such type safety system is complicated, especially when the same must be employed with installations which are already installed in the ground and previously were not provided with any safety device for the conduit arrangement, since subsequent modification of the installation requires exposing or laying-open the conduit arrangement. This necessitates complicated excavation and installation work.

SUMMARY OF THE INVENTION

Hence, it is a primary object of the present invention to provide a new and improved construction of a leakage protective apparatus for storage containers or the like which is not associated with the aforementioned drawbacks and limitations of the prior art proposals.

Another and more specific object of the present invention aims at providing a simple and positive leakage or spill protective apparatus of the previously mentioned type which, with very little additional expenditure and work, also can be subsequently installed at storage containers already mounted in the ground and insures for positive protection of the conduit system or arrangement.

Now in order to implement these and still further objects of the invention, which will become more readily apparent as the description proceeds, the invention contemplates the provision of a negative pressure source which communicates with the conduit arrangement.

With the invention the conduit arrangement for the stored material always is maintained at a negative pressure. In this way there can be avoided any spill-out due to leaks.

If the negative pressure, which, for instance, should be realized by utilization of a vacuum pump, is not sufficient due to the occurrence of a leak or a disturbance at the negative pressure generator, then measures are advantageously undertaken wherein the disturbance is indicated and/or the conveying of the stored material is automatically discontinued. According to the invention this is preferably realized in that a shutoff valve is connected in the conduit arrangement, and a switching device is provided which can be actuated in the presence of a pressure change, this switching device, upon exceeding a predetermined minimum negative pressure in the conduit arrangement, causing the shutoff valve to close. With a leakage protective apparatus which is designed in this manner there is realized a reliable protection for the conduit arrangement also in those instances where conduit components are located below the level of the storage container, as is oftentimes the case for older ground-sunk installations which subsequently should be equipped with a leakage protective device for the conduit arrangement.

After closing of the shutoff valve the pump can still further convey the medium located between it and the shutoff valve, in order to thereafter be shutoff by means of a special switch which is responsive to the sucking-up of air. However, the pump also can be directly shutoff by the switching device, for instance simultaneous with the shutting-off of the shutoff valve.

A preferred constructional manifestation of the invention is realized if the negative pressure source is connected via an intermediate container which is arranged in the conduit arrangement and the actuation of the switching device is derived from a change in the level of the medium in the intermediate container. In this regard, it is preferable if the conduit branch between the storage container and the intermediate container opens from above into the intermediate container. The conduit branch located between the intermediate container and the pump, just as the intermediate container itself, can be freely accessible. An outflow at this conduit portion, in the event of a leak, can thus be avoided in that the pressure generated by the negative pressure source is so low that also at the lowest locations of the conduit arrangement, at which the static pressure produced by the liquid is at a maximum, the total pressure is smaller than the ambient pressure.

Protection against spill or outflow of the storage container itself is not subject matter of the invention. This protection can be accomplished in any other suitable and known manner, for instance by fabricating the storage container of plastic or coating the storage container with plastic. In these instances monitoring the storage container against leaks cannot be dispensed with.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
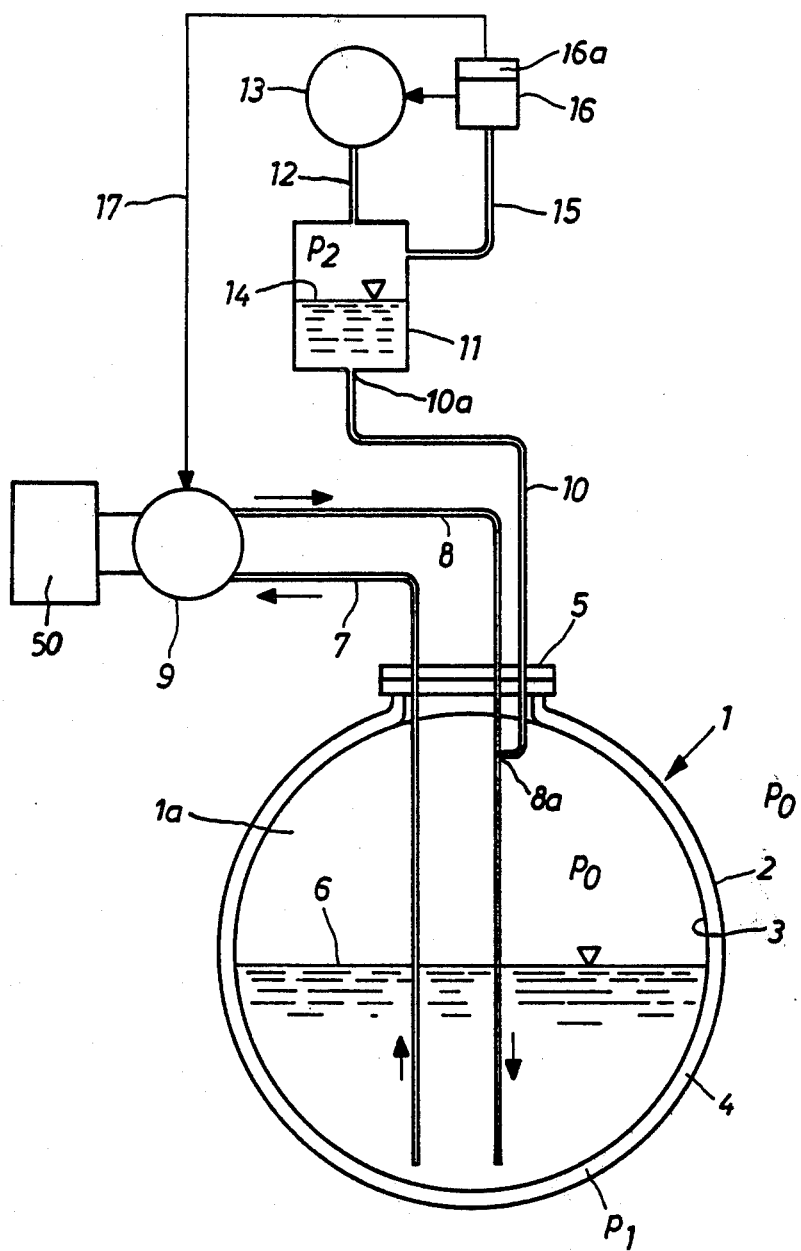
FIG. 1 is a schematic view of a first exemplary embodiment of leakage protective apparatus according to the invention employed with an oil heating installation.

Describing now the drawings, in FIG. 1 reference character 1 designates a double-wall storage container for heating oil. Between the metallic outer jacket or shell 2 and an inner plastic jacket or shell 3 there is formed an intermediate space or compartment 4 which is filled with an open pore foam plastic. This intermediate space 4 can be evacuated by means of a not particularly illustrated vacuum conduit or line to a pressure $p_1$ for leakage monitoring.

The storage container 1 is closed by means of a dome cover or cover member 5 which, for the illustrated exemplary embodiment, need not be pressure tight, so that there can prevail above the liquid level 6 within the storage container the ambient pressure $p_0$.

The dome cover 5 has extending therethrough an outflow, conduit 7 and a return flow conduit 8 which, together with a pump 9 and a merely schematically illustrated consumer 50, form a flow circulation system. The pump 9, when in operation, circulates heating oil, a fraction of which, for instance 10% is consumed by the consumer, which may be for instance a burner or a heating vessel.

Furthermore, the dome cover 5 has piercingly extending therethrough a negative pressure conduit 10 which within the internal space 1a of the storage container 1 flow communicates at location 8a with the return flow conduit 8. By means of its end 10a remote from the storage container 1 the negative pressure conduit 10 is connected with a negative pressure container 11 which, in turn, flow communicates via a connection conduit 12 with a vacuum pump 13. The vacuum pump 13 produces within the negative pressure container 11 a pressure $p_2$ which is smaller than the ambient pressure $p_0$, however greater than the pressure $p_1$ in the space between both walls 2, 3. The pressure $p_2$ therefore should not be selected to be smaller than the pressure $p_1$, so that the plastic inner wall 3, for instance consisting of a flexible plastic material, is not sucked or pressed into the interior or internal space 1a of the storage container 1.

During operation, there is formed a liquid level or column 14 in the negative pressure container 11, above which there exists a cushion of air at the pressure $p_2$. This pressure $p_2$ is delivered via a conduit 15 to a switching or regulation device designated in its entirety by reference character 16, this switching device containing a pressure measuring device, as schematically represented by reference character 16a. The switching device 16 compares the measured pressure $p_2$ with a predetermined reference pressure. If the pressure $p_2$ exceeds a predetermined minimum negative pressure, then the switching device 16 automatically turns-on the vacuum pump 13, which again produces a pressure in the negative pressure container 11 corresponding to the reference negative pressure.

The switching device 16 is connected via a signal flow line 17 with the pump 9 for actuating i.e. turning-on and turning-off such pump for circulating the heating oil.

If any leaks in the conduit system or arrangement 7, 8 forming the flow circulation system become too large, then even with continuous operation of the vacuum pump 13, the pressure $p_2$ no longer can be maintained in the negative pressure container. In this case there exists an acute spill-out danger of heating oil through the aforementioned leakage location or locations. Upon exceeding the minimum negative pressure in the container 11 the regulation or switching device 16 therefore automatically shuts-off the pump 9 by means of the signal flow line 17. There is advantageously simultaneously activated a disturbance indicator by the regulation or switching device 16.

It will be seen that the negative pressure container 11 additionally also can be connected at the outflow conduit or line 7. Also the negative pressure conduit 10 can communicate externally of the inner space or compartment 1a of the storage container 1 with the return flow conduit 8 and the outflow conduit 7.

Figure 2:
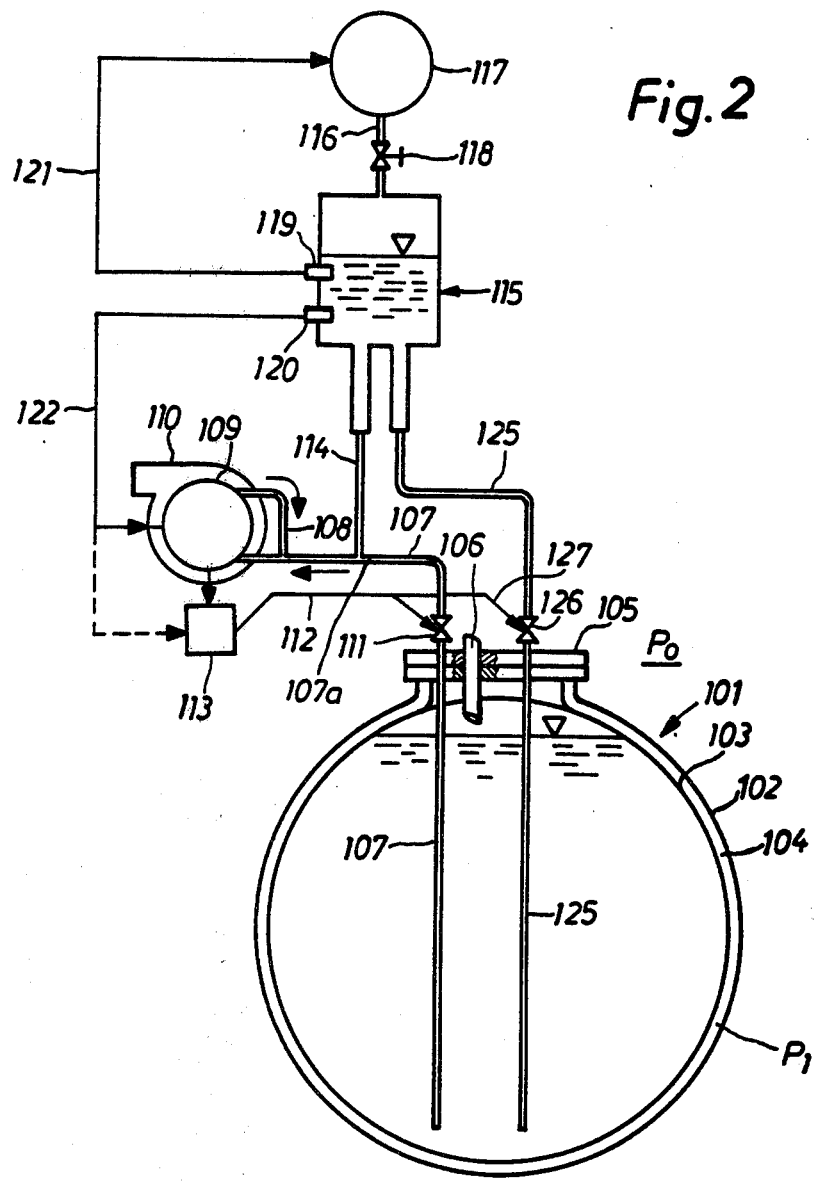
FIG. 2 illustrates a second exemplary embodiment of leakage protection apparatus employed with an oil heating installation.

In the variant embodiment of FIG. 2 there is designated in its entirety by reference character 101 a double-wall storage container for heating oil. Between the metallic outer shell or jacket 102 and an inner plastic jacket or shell 103 there is formed an intermediate space or compartment 104 which can be filled with an open pore foam plastic. This intermediate space 104 can be maintained by a not particularly illustrated negative pressure line at a pressure $p_1$ below the ambient pressure $p_0$.

The storage container 101 is closed by means of a dome or dome cover 105, through which piercingly extends a vent pipe or conduit 106, so that there also exists above the liquid level the ambient pressure $p_0$ in the storage container 101.

Furthermore, there piercingly extends through the dome cover 105 an outflow conduit or line 107 which extends from the base of the storage container 101 to a burner pump 109 of a burner 110. Leading back from the pump 109 into the outflow conduit 107 is a return flow conduit 108, which however can be omitted. In the outflow conduit 107 there is installed a shutoff valve 111 directly above the dome cover 105. This shutoff valve 111 can be actuated by means of a signal flow line 112 from a switching or regulation device 113. Into the conduit section 107a of the outflow conduit or line 107 between the pump 109 and the shutoff valve 111, there opens a branch conduit 114 leading to an intermediate container 115. At the top of this intermediate container 115 there is connected, by means of a conduit 116, a vacuum pump 117. The conduit 116 can be shutoff or closed by means of, for instance, a manually actuated shutoff valve 118. At two different levels of the intermediate container 115 there are arranged the level sensors or feelers 119 and 120. The upper level feeler 119, when the liquid level in the intermediate container 115 drops below its level, is energized so as to produce a switching pulse which turns-on the vacuum pump 117. This switching pulse is delivered to the vacuum pump 117 via the signal flow line 121. The lower level feeler 120, when the liquid level in the intermediate container 115 drops below its level, acts through the agency of a signal flow line 122, either by means of the pump 109 or directly (as shown in broken lines), upon the switching device 113, in order to trigger a switching signal which blocks the shutoff valve 111. The shutoff valve 111 is preferably initially blocked by the switching device 113 before the pump 109 is turned-off. The pump 109 can receive a shutoff pulse, completely independent of the signal of the level feeler, for instance as soon as it conveys air instead of liquid to the burner 110 defining the consumer.

If a leak arises in the conduit arrangement or system between the storage container 101 and the pump 109, then initially due to the dropping of the liquid level in the intermediate container 115 the vacuum pump 117 is turned on by means of the level feeler 119. During further sinking of the liquid level below the level of the level feeler 120 there is delivered, via the signal flow line 122, a switching signal which activates the switching device 113 for closing the shutoff valve 111. The arrangement is advantageously undertaken such that the pump 109 still then pumps the liquid which is located between the shutoff valve 111 and the pump 109 to the burner and then is shutoff by the air conveyed into the pump.

The dome cover 105 additionally has piercingly extending therethrough a measuring line or conductor 125, leading to the base of the container 101 and connected with the intermediate container 115. Also connected with this measuring line or conductor 125, without which the leakage protection device likewise would be functional, is a shutoff valve 126. This shutoff valve 126 can be simultaneously blocked along with the shutoff valve 111 by means of a branch line 127 leading from the signal flow line 112, so that also the measuring line 125 which, in the exemplary embodiment, forms part of the conduit arrangement is protected against leaks.

With the embodiment of FIG. 3 the parts of the conduit arrangement or system including the pump 209 and the burner 210 are arranged below the level of the container 101, without impairing the function of the spill or leakage protection. A still more important difference in the embodiment of FIG. 3, in contrast to that of FIG. 2, resides in the fact that the intermediate container 215 is connected with the outflow conduit 207. The conduit portion or section 207a between the pump 209 and the intermediate container 215, for installations normally encountered in practice, is generally short and easily accessible (above ground), whereas the conduit portion 207b between the intermediate container 215 and the shutoff valve 211 is longer and is embedded in the ground. In this way there is eliminated the possibility that air will be sucked-up by the pump 209 into the burner 210 before all of the liquid has been sucked-out of the intermediate container 215. With the embodiment of FIG. 3 there is not provided any measuring line corresponding to the measuring line 125 of FIG. 2. The level feeler 220 is directly connected with the switching device 213 via the signal flow line or conductor 222. Leading from such switching device 213 is a further signal flow line 219 to the switch of the pump 209.

Mounted in the outflow line or conduit 207, directly in front of the pump 209, is a check valve 228, which prevents any return flow of liquid from the pump 209 to the intermediate container 215. This does not preclude that, also with the embodiment of FIG. 3, there is provided a return flow line or conduit leading from the pump 209, which can communicate in front of or behind the check valve 228, with the outflow line or conduit.

Upon the occurrence of a leak in the conduit arrangement the switching device 213, by means of the signal flow line 229, simultaneously also shuts off the pump 209 together with closing of the shutoff valve 211. The pump 209 can also be shutoff with a time-delay after the closing of the shutoff valve 211, which however should be of shorter duration than the time needed for sucking-up the liquid in the intermediate container 215, so that there can be avoided sucking-up of air through the pump 209.

Figure 3:
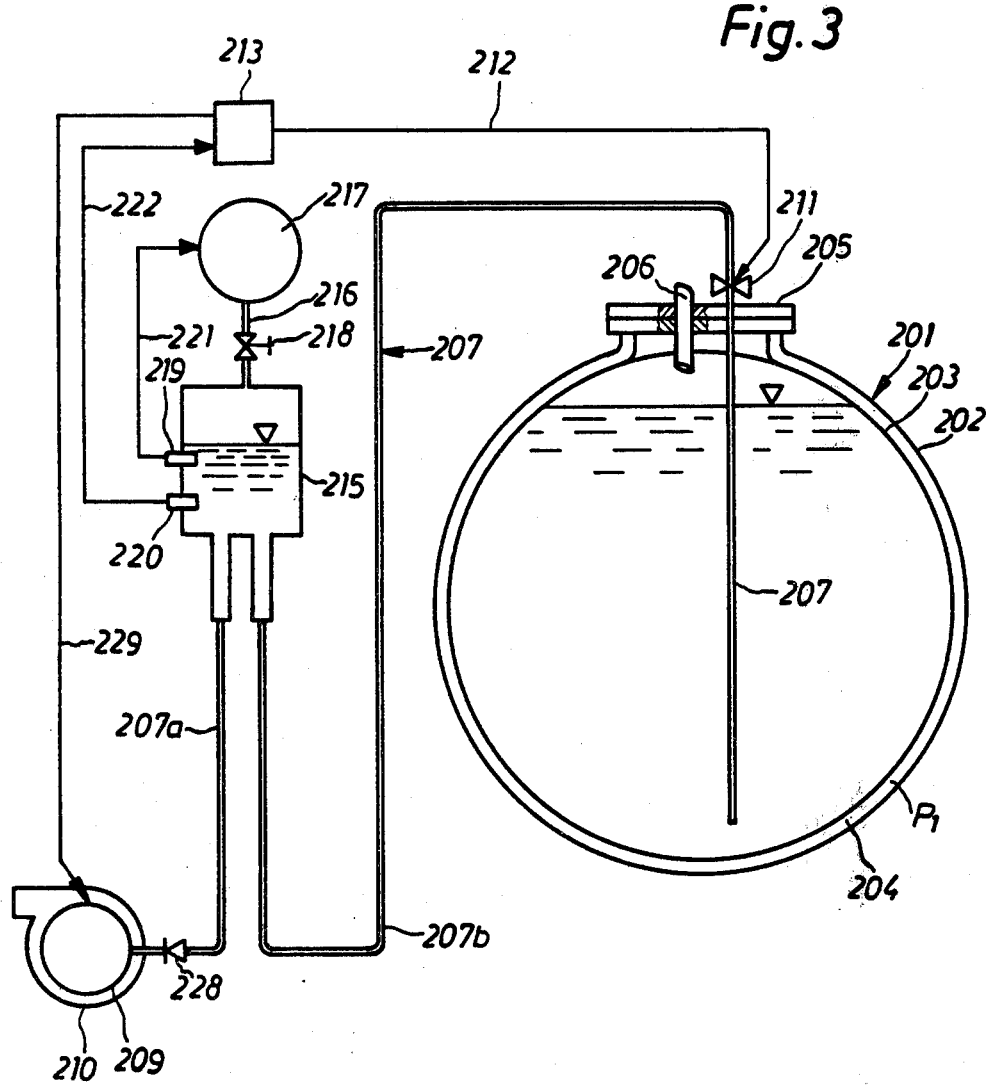
FIG. 3 is a third exemplary embodiment of leakage protection apparatus employed with an oil heating installation.

In other respects the construction and function of the embodiment of FIG. 3 corresponds to that of FIG. 2, so that any additional description is unnecessary, specifically since reference can again be made to the disclosure concerning FIG. 2.

Figure 4:
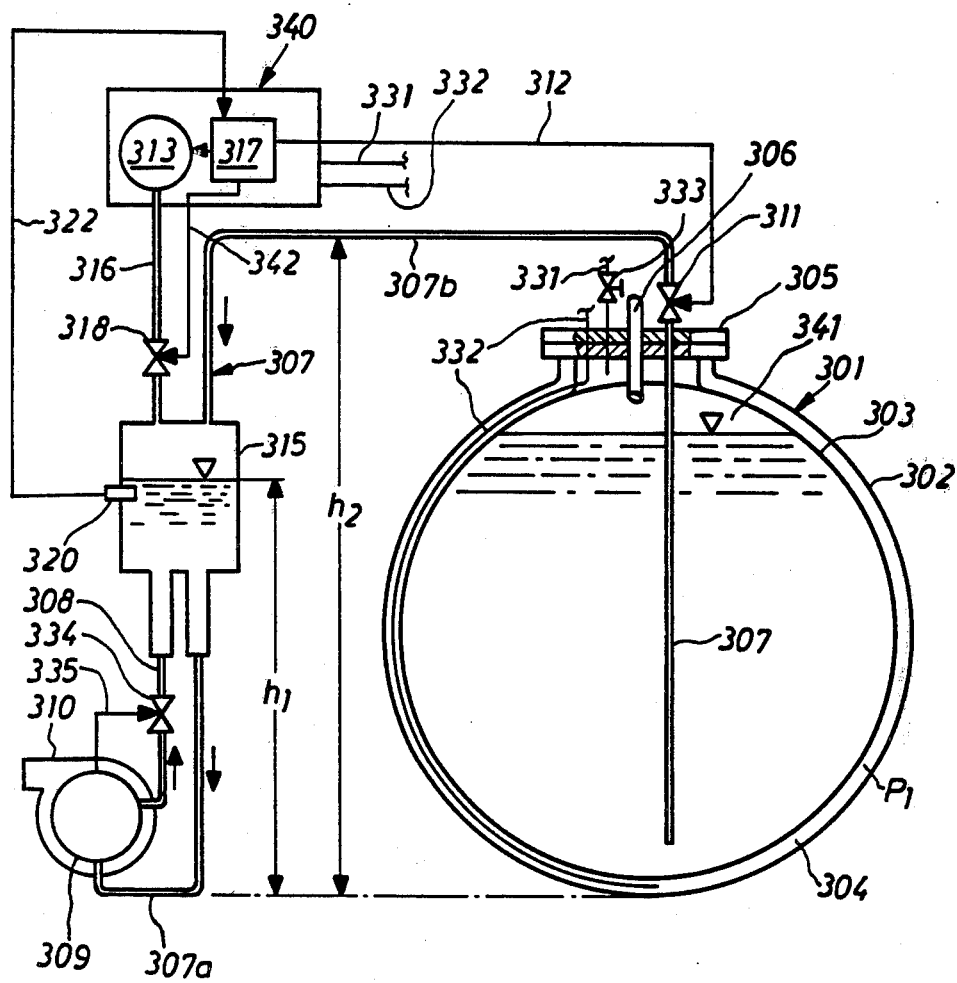
FIG. 4 is a fourth exemplary embodiment of leakage protection device employed with an oil heating installation.

Now in FIG. 4 the functionally same components as those of the embodiment of FIG. 3 have been designated with the corresponding reference character but increased by the value 100. Further, in order to avoid unnecessary repetition the same structure has not again been here described. The description of FIG. 4 therefor will be concerned predominantly with the difference in its construction from that of the previously described exemplary embodiments.

Similarly as with the embodiment of FIG. 3 also with the embodiment of FIG. 4 the intermediate container 315 is directly connected with the conduit arrangement 307 between the storage container 301 and the pump 309.

The intermediate container 315 is arranged at the elevational difference $h_1$ above the lowermost level of the storage container 301. In the illustrated embodiment, the pump 309 and the conduit branch 307a supplying such pump of the conduit arrangement 307 are each located with its lowermost portion disposed at the same level as the lowermost level of the storage container 301, however also could be situated lower and of course also higher, without thereby impairing the functionality of the leakage protection device. For instance, the height $h_1$ can amount to three meters. Also in this case in order to be able to completely protect the conduit portion 307a, the negative pressure in the intermediate container 315, at most can attain a value of absolute 7 mWs (with this embodiment it has been assumed by way of simplification that the stored material has the same specific weight as water).

The branch conduit 307b is located with one part above the intermediate container 315 and opens thereinto from the top. In this way there is insured that even with a pressure increase in the intermediate container, for instance owing to a disturbance during generation of the negative pressure, liquid flows out of this conduit branch into the intermediate container.

In FIG. 4 there have been schematically illustrated the switching device 317 and the negative pressure source 313 grouped together into a box designated by reference character 340. This box symbolizes the housing of a device, as the same is used in practice for grouping together the aforementioned components as well as other components, for instance an indicator. The device additionally can encompass a leakage protection device for the wall of the container 301. Essentially there is associated with such second leakage protection device a suction line 331, by means of which there is produced a negative pressure of a pressure $p_1$ in the space between both container walls 302 and 303, as well as a measuring line 332, by means of which there is measured the negative measure. An increase in the pressure $p_1$ beyond a predetermined value indicates a leakage in the container wall 303. The suction conduit or line 331 also contains a shutoff valve 333.

Also the embodiment of FIG. 4 is equipped with a return flow conduit or line 308 at which there is arranged a shutoff valve in the form of a magnetic valve 334, actuated by an electrical pulse delivered by the signal flow line 335 leading from the pump.

The overflow or leakage protective apparatus depicted in FIG. 4 operates as follows:

With the illustrated arrangement all of the branch conduits 307a, 307b and 308 of the conduit arrangement or system 307 are exposed to the negative pressure prevailing in the intermediate container 315 and therefore are monitored. The precondition for the build-up of the negative pressure is that the infeed line, leading from the inner space 341 of the storage container 301 which is not at negative pressure, is tight or leakproof.

Now if the pump 309 is turned-on and the burner 310 is ignited, then the pump 309 sucks oil out of the intermediate container 315. As soon as the level in the intermediate container 315 drops below the level feeler 320, then, the level feeler 320 delivers a pulse to the switching device 317, which, in turn, transmits a switching pulse via the signal flow line 312 to the shutoff valve 311 likewise constructed as a magnetic valve, in order to open such shutoff valve. Due to the negative pressure in the space above the oil level in the intermediate container 315 oil is now sucked up via the branch conduit 307b into the intermediate container, until the level again rises past the level feeler 320. Consequently, by means of a new pulse delivered by the level feeler 320 and a switching pulse triggered thereby by means of the switching device 317 the shutoff valve 311 is closed.

In the following cases the leakage protection apparatus described in conjunction with FIG. 4 triggers switching operations and an alarm:

(1) If a leak in a branch conduit 307a, 307b, and/or 308 becomes so large that the pump 313 no longer can maintain a predetermined negative pressure, then the shutoff valve 311 is closed and triggers an alarm.

If the leak occurs at the non-accessible conduit branch 307b, then the liquid located between the leakage location and the intermediate container 315 flows into the intermediate container, and the liquid located in the conduit branch section between the leakage location and the shutoff valve 311 remains in the aforesaid branch conduit section and does not flow-out. Thus, there is insured a complete control of leaks at random locations of the non-accessible branch conduit 307b between the intermediate container 315 and the shutoff valve 311 and there is eliminated any uncontrolled leakage from the storage container or outflow from liquid located in the conduit branch sections.

(2) If the level feeler 320 is not in operation with the shutoff valve closed, that is to say with the oil level below its level, then the shutoff valve 311 remains closed. The pump 309 sucks the intermediate container 315 empty and triggers an alarm.

(3) In the event that the level feeler 320 becomes inoperative with the shutoff valve 311 opened, that is to say, with a higher liquid level than its level in the intermediate container 312, for instance owing to rupture, then the shutoff valve 311 initially remains open. The intermediate container 315 receives too much oil, so that the pressure in the intermediate container 315 climbs beyond the maximum permissible negative pressure. This again triggers an alarm 340 and thus the delivery of a closing signal via the line 312 to the shutoff valve 311. At this point in time the intermediate container 315 is not completely full, so that the vacuum pump 313 can again build up the vacuum in the space above the liquid level in the intermediate container 315. As a result, the alarm is automatically shutoff and the shutoff valve 311 is again opened so that once again oil can flow into the intermediate container 315. This results in the permissible negative pressure in the intermediate container 315 again being exceeded. When the intermediate container 315 is full, then a signal is triggered which blocks a magnetic valve 318 and the suction conduit 316 of the vacuum pump 313 via the signal flow line 342. Now a negative pressure no longer can build up in the intermediate container 315, so that the alarm condition is maintained and the shutoff valve 311 remains closed. With this condition the pump 309, in turn, due to sucking oil out of the intermediate container 315 and by thus building up a negative pressure in the space above the oil level, can shut off the alarm. The alarm condition is again however rapidly established, because the oil which flows in via the branch conduit 307b again permits the thus generated negative pressure to immediately climb to an impermissibly high value. Thus, also with this last-described disturbance the alarm is also maintained.

The intermediate container, with the embodiments of FIGS. 3 and 4, as also the branch conduits 207a and 307a respectively, can be freely accessible. The intermediate container, in this case, can be provided with a viewing glass for the optical control of the level of the oil in the intermediate container, which is important for the functionality of the equipment.

While there are shown and described preferred embodiments of the invention, it is to be distinctly understood that the invention is not limited thereto, but may be otherwise variously embodied and practiced within the scope of the following claims. Accordingly,

What is claimed is:

1. A leakage protective apparatus for the outlet line of a storage container for flowable material, comprising
   a storage container,
   a consumer,
   a conduit arrangement connecting the storage container and consumer,
   the conduit arrangement including a pump for pumping the flowable material from the storage container to the consumer,
   the conduit arrangement further including an intermediate container connected between the pump and storage container,
   a negative pressure source connected to the intermediate container,
   the conduit arrangement further including a shutoff valve,
   means for detecting a predetermined minimum negative pressure in the conduit arrangement,
   and a switching device for closing the valve when the detecting means detects a pressure above the predetermined minimum negative pressure.

2. The apparatus as defined in claim 1, wherein the conduit arrangement comprises an outflow conduit means and a return flow conduit means, the negative pressure source communicating with the outflow conduit means.

3. The apparatus as defined in claim 1, including means for shutting-off the pump upon exceeding said minimum negative pressure.

4. The apparatus as defined in claim 1, wherein a level feeler is arranged in the intermediate container, said level feeler being activated by the level of the medium for delivering a switching pulse to the switching device.

5. The apparatus as defined in claim 4, including a further level feeler located at a higher level than the other level feeler in the intermediate container, said further level feeler delivering a switching pulse upon activation by the level of the medium, which switching pulse switches-on the negative pressure source, said negative pressure source comprising a vacuum pump.

6. The apparatus as defined in claim 5, further including a branch conduit for connecting the intermediate container with the conduit arrangement.

7. The apparatus as defined in claim 5, wherein the intermediate container is connected at the conduit arrangement.

8. The apparatus as defined in claim 7, further including a branch conduit member which opens between the storage container and the intermediate container from above into said intermediate container.

9. The apparatus as defined in claim 8, wherein the intermediate container is located at a higher level than the pump both said intermediate container and said branch conduit member freely accessible, said branch conduit member extending between said intermediate container and said pump.

10. The apparatus as defined in claim 7, wherein the conduit arrangement includes an outflow conduit, said shutoff valve being arranged in said outflow conduit between the intermediate container and the storage container.

11. The apparatus as defined in claim 1, wherein the pressure generated by the negative pressure source is so small that even at the lowest location of the conduit arrangement at which the static pressure produced by the liquid column is at a maximum, the total pressure is smaller than the ambient pressure.

12. The apparatus as defined in claim 1, wherein the conduit arrangement includes an outflow conduit extending from said intermediate container, and the shutoff valve is arranged in the outflow conduit at a location where it departs out of the storage container.

13. The apparatus of claim 1, wherein the conduit arrangement further includes a return flow conduit connected between the consumer and intermediate container.

* * * * *